US006840338B2

(12) United States Patent
Bowers et al.

(10) Patent No.: US 6,840,338 B2
(45) Date of Patent: Jan. 11, 2005

(54) ARTICULATION OF SUSPENSION IN AN INDEPENDENTLY SUSPENDED BEAM STRUCTURE

(75) Inventors: Lee N. Bowers, Tokyo (JP); Mark Kittel, Marysville, OH (US); Hidefumi Ishii, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/382,380

(22) Filed: Mar. 6, 2003

(65) Prior Publication Data

US 2003/0221879 A1 Dec. 4, 2003

Related U.S. Application Data

(60) Provisional application No. 60/362,769, filed on Mar. 8, 2002, and provisional application No. 60/362,768, filed on Mar. 8, 2002.

(51) Int. Cl.[7] ............................................. B62D 55/00
(52) U.S. Cl. ..................................... 180/9.54; 180/9.1
(58) Field of Search ........................... 180/192, 9, 9.21, 180/9.1, 9.26, 9.5, 9.52, 9.54, 9.56, 9.58, 9.6, 353, 359

(56) References Cited

U.S. PATENT DOCUMENTS

| 3,430,790 | A | * | 3/1969 | Osmano ...................... 414/695 |
| 3,521,527 | A | | 7/1970 | Gies et al. |
| 3,602,470 | A | | 8/1971 | Reynolds |
| 3,724,397 | A | | 4/1973 | Sargent |
| 3,856,325 | A | | 12/1974 | Willets |
| 3,894,597 | A | | 7/1975 | Wagner |
| 3,948,334 | A | | 4/1976 | Danielson et al. |
| 3,982,598 | A | | 9/1976 | Purcell et al. |
| 4,030,738 | A | | 6/1977 | Willetts |
| 4,043,417 | A | | 8/1977 | Orpana |
| 4,153,265 | A | | 5/1979 | McColl |
| 4,155,570 | A | | 5/1979 | Wiley, Jr. |
| 4,171,027 | A | * | 10/1979 | Seit et al. .................. 180/9.54 |
| 4,227,711 | A | | 10/1980 | Wheeler |
| 4,360,220 | A | | 11/1982 | Beers |
| 4,364,443 | A | | 12/1982 | Sato et al. |
| 4,429,898 | A | | 2/1984 | Bedenbender et al. |
| 4,516,649 | A | | 5/1985 | Braathen |
| 4,519,654 | A | | 5/1985 | Satzler et al. |
| 4,582,153 | A | | 4/1986 | Shinsen |
| 4,811,972 | A | | 3/1989 | Wiley, Jr. |
| 4,923,257 | A | | 5/1990 | Purcell |
| 4,974,684 | A | | 12/1990 | Stevens |
| 4,987,965 | A | | 1/1991 | Bourret |
| 5,016,905 | A | | 5/1991 | Licari |
| 5,048,632 | A | * | 9/1991 | Battel ......................... 180/181 |
| 5,064,011 | A | | 11/1991 | Ogano et al. |
| 5,076,378 | A | | 12/1991 | Lagace |
| 5,113,958 | A | | 5/1992 | Holden |
| 5,293,948 | A | | 3/1994 | Crabb |
| 5,482,326 | A | | 1/1996 | Levi |
| 5,566,773 | A | * | 10/1996 | Gersmann ................... 180/9.5 |
| 5,575,347 | A | * | 11/1996 | Uchibaba et al. ............ 180/9.1 |
| 5,791,681 | A | | 8/1998 | VanDenberg |
| 5,975,226 | A | * | 11/1999 | Matsumoto et al. ....... 180/9.34 |

* cited by examiner

*Primary Examiner*—Daniel G. DePumpo
(74) *Attorney, Agent, or Firm*—Rankin, Hill, Porter & Clark LLP; Christen Millard

(57) ABSTRACT

A half-track all-terrain vehicle having an independent suspension system that provides an improved vehicle ride and facilitates traversing obstacles. The vehicle includes a frame, a pair of beams that each holds front and rear wheels, and a suspension system extending between the each beam and the frame. The suspension system includes a plurality of cushions. The cushions are tuned such that forward cushions have a relatively greater suspension stroke than the rearward cushions and thereby permit the front wheels to engage the ground sequentially before the rear wheels when the vehicle goes over a step or drop off. The suspension system is further tuned to permit the vehicle to traverse an obstacle having a height that is slightly lower than the frame clearance by permitting the front wheels to lift vertically to a distance essentially equal to the frame clearance.

22 Claims, 5 Drawing Sheets

ARTICULATION OF SUSPENSION IN AN INDEPENDENTLY SUSPENDED BEAM STRUCTURE

BACKGROUND OF THE INVENTION

1. Field of the Invention

The present invention generally relates to vehicle suspension systems and, more particularly, toward an independently suspended beam structure for a multi-use vehicle.

2. Description of Related Art

It is known to independently suspend wheels from a vehicle frame. An independently suspended wheel is able to move in one or more directions without affecting the movement of any other wheels. It is desirable to independently suspend wheels to improve the ride of a vehicle when traveling over a road or ground that may be uneven. It is also desirable to use a track on each side of the vehicle. The use of a track, rather than individual wheels only, improves the vehicle's flotation on soft ground as well as the traction. It is particularly important to use an independent suspension system when a track is used, to maximize the amount of surface area of each track in contact with the ground on each side of the vehicle.

It is also known to suspend beams from vehicles. In a typical configuration, a beam is suspended on each side of a vehicle. Two or more wheels are attached to the beam. Typically, axles or other structures rigidly interconnect the beams so that the beams move together relative to the frame. These types of structures are normally used in areas where the terrain is likely to be substantially level.

Some suspension systems are like those used on military vehicles and are schematically illustrated in FIG. 1. This half-track structure 10 includes a track 12 that surrounds a plurality of wheels 14, 16. The two end wheels 14 are mounted directly to the frame with no suspension system. The main load-bearing wheels 16 are individually suspended from the frame.

Other suspension systems are used on vehicles similar to the SNO CAT vehicle, which is made by Tucker Sno Cat Corporation of Oregon, and schematically illustrated in FIG. 2. This half-track structure 20 includes a track 22 surrounding a plurality of wheels 24, 26. The top wheel 24 is connected to a central axle 28. The central axle 28 provides the drive function and is suspended from the vehicle. The remaining wheels 26 are attached to the central axle 28. The track 22 can rotate about the central axle 28, but the central axle links the motion of the two structures 20 on either side of the vehicle.

Finally, there are MUV suspension systems, such as is schematically illustrated in FIG. 3. In this structure 30, a trailing arm 32 is attached to each beam 34 (only one beam shown in the drawing) and connects the beam to a frame (not shown). While each beam may include its own springs or cushions 36, the axles 38 conventionally extend across the vehicle, thereby linking the motion of the two beams.

Such structures are unsatisfactory for use in an off-road setting. Typically, an MUV is used in an area where there are substantial differences in terrain on both sides of the vehicle. It is also desirable to use a half-track on an MUV to permit the MUV to traverse many types of terrain, particularly in wet areas, without sinking. However, no structure has been developed that permits each beam to be independently suspended. In an off-road setting, an independent suspension would be particularly desirable since the variations in the level of the ground can be substantial.

Further, one of the problems to be solved with off-road vehicles is that of travel over large objects, such as logs. Manufacturers have addressed this problem by using low pressure tires. The use of a low pressure tire allows the tire to deform when it encounters an object. This increases the surface area, and hence the friction, between the low pressure tire and the object, enabling the motive force of the vehicle to push the vehicle up and over the object.

However, the use of low pressure tires is not desirable for use with a tracked vehicle. If a low pressure tire is used and the tire deforms, the track tends to have an increased amount of slack at the time of deformation, substantially increasing the risk of the track slipping off the tires. It is inconvenient to attempt to reinstall a track that has become disengaged from the tires, particularly in an off-road setting.

Moreover, if a tracked vehicle is to be used, a high pressure tire should be used to prevent the detachment of the track. Unfortunately, the use of such a tire creates a reduced amount of surface area contact between the vehicle and the obstacle, which causes the track to slip against the obstacle and prevents the vehicle from passing over the obstacle. Therefore, in the prior art a high pressure tire is known to be undesirable.

An additional problem is common among three or more axle vehicles, namely, poor ride performance when a vehicle falls off of an obstacle or step. This problem is illustrated in FIGS. 7 and 8. Only some of the components of the vehicle are illustrated, as it will be apparent to one of ordinary skill in the art how to attach and configure the remaining parts of the vehicle. Turning to FIGS. 7 and 8, a prior art vehicle 40 is shown. The vehicle 40 includes a front wheel 42 attached via a cushion 44 to a front portion of a frame 46. A beam 48 is attached to the rear portion of the frame 46. The beam 48 is supported from the frame 46 by two cushions 44, each of which is near an end of the beam 48. Two wheels 50 are attached to the beam 48. A track (not shown) may be extended around the rear wheels 50. When the vehicle 40 encounters an object 52, such as a log or other object with a steep drop off, the cushion for the front wheel is able to absorb a good bit of the shock with no problem. However, the rear suspension structure does not absorb the shock as well. The rear wheels drop to the ground at the same time and rate as the front wheels, causing the shock to be absorbed by all four rear wheels 50 (two on each side) simultaneously. This shock is quite large, due to the change in damping across all the cushions 44. Accordingly, an improvement is needed to prevent the shock to the system and improved ride conditions.

None of the suspension systems known in the art and described hereinbefore is acceptable for use on an MUV. Specifically, none of the known systems provides an independent suspension for a multi-rear axle vehicle wherein the vehicle is adapted to traverse drop-offs or steps with reduced shock to the vehicle and the occupants. Moreover, none of the known systems provide an independent suspension for a half-tracked vehicle that is adapted to traverse obstacles, such as logs, ruts, and rocks.

SUMMARY OF THE INVENTION

The present invention is directed toward an improved suspension system adapted for a multi rear axle MUV vehicle that reduces or minimizes the problems in the art. The present invention is further directed toward an MUV suspension that reduces impacts experienced when the vehicle traverses changes in elevation during off-road operation. The present invention is also directed toward an MUV suspension that facilitates climbing of obstacles encountered during operation of the vehicle in an off-road setting.

In accordance with the present invention, a multi rear axle vehicle includes a frame, first and second beams, and first and second suspension systems associated with the first and second beams, respectively.

In further accordance with the present invention, each of the first and second beams holds first and second wheels and each of the first and second suspension systems includes first and second cushions. The first and second cushions extend between the frame and the associated beam, and are secured to ends of the associated beam adjacent to the first and second wheels, respectively. The first and second suspension systems are substantially independent of one another to permit either of the first and second beams to move relative to the frame without affecting the other of the first and second beams.

In further accordance with the present invention, the first cushions have a suspension stroke that is larger than the suspension stroke of the second cushions. Accordingly, when the vehicle rides over a step or drop-off, the first wheels associated with the first cushions strike the ground sequentially before the rear wheels, leading to improved ride conditions.

In further accordance with the present invention, the vehicle frame is spaced a first distance or frame clearance from the ground, while the beams are spaced a second, smaller distance from the ground. When the first wheels engage an obstacle, the suspension systems are adapted to permit the first wheels to rise vertically toward the first distance to permit the vehicle to traverse an obstacle slightly smaller than the frame clearance.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
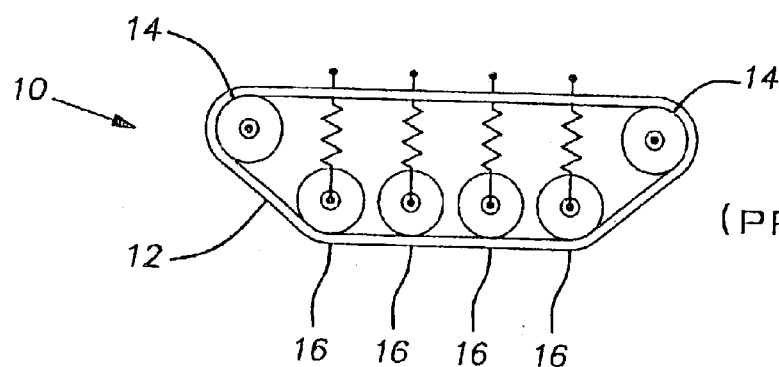
FIG. 1 is a schematic side view of a first prior art half-track suspension structure.
Figure 2:
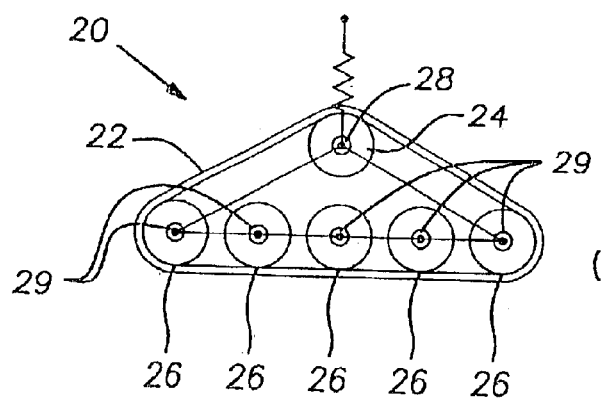
FIG. 2 is a schematic side view of a second prior art half-track suspension structure.
Figure 3:
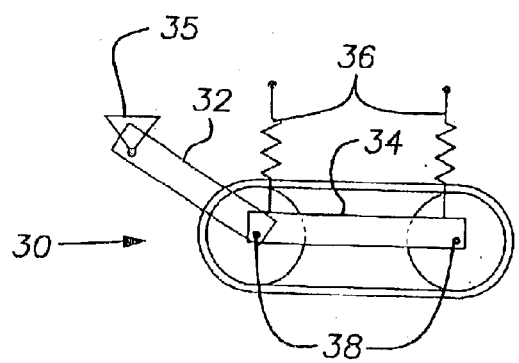
FIG. 3 is a schematic side view of a third prior art half-track suspension structure.

The present invention relates to a suspension system for a half-track vehicle. Initially, it is noted that the drawings are not to scale, but will be more easily understood by a person of ordinary skill in the art than drawings from another perspective or drawings shown in proper proportion. It is further noted that the drawings do not show any other structures attached to the vehicle, nor do they show any structures necessary for the functioning of the vehicle that are not directly related to the suspension structure disclosed. Accordingly, the vehicle shown in the drawing figures may not be functional without the other parts, such as a drive train and the like. However, any drive train that may be used in connection with the present structure is relatively conventional in nature. A person of ordinary skill in the art can easily adapt a known MUV or ATV drive train for use in connection with the present vehicle.

Figure 4:
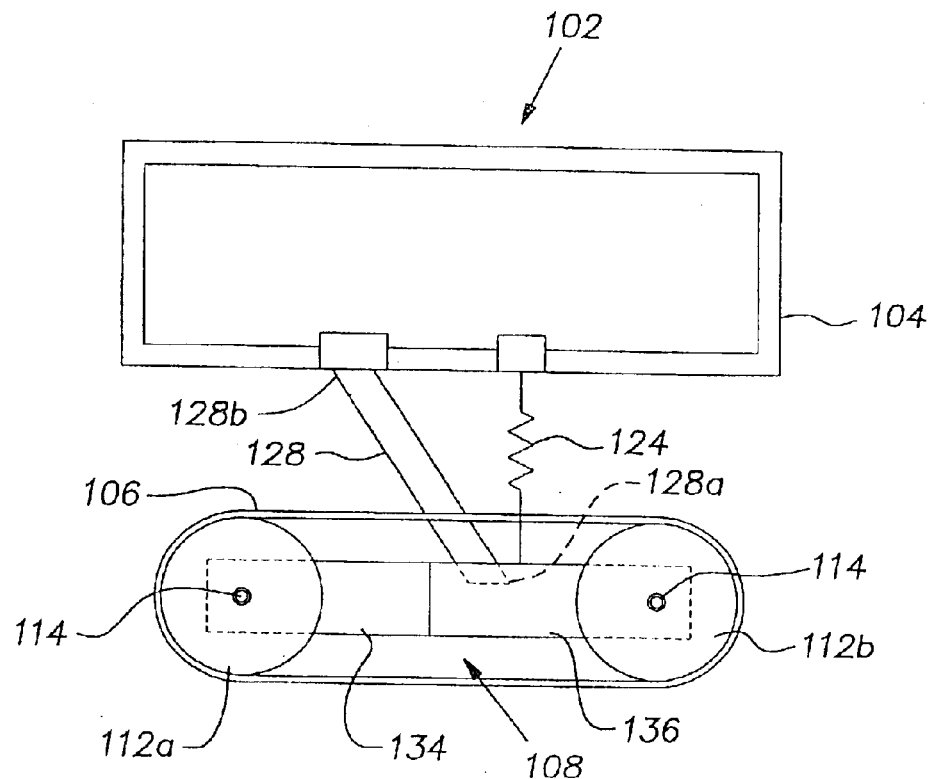
FIG. 4 is a schematic side view of an embodiment of a half-track suspension structure and vehicle in accordance with the present invention.
Figure 5:
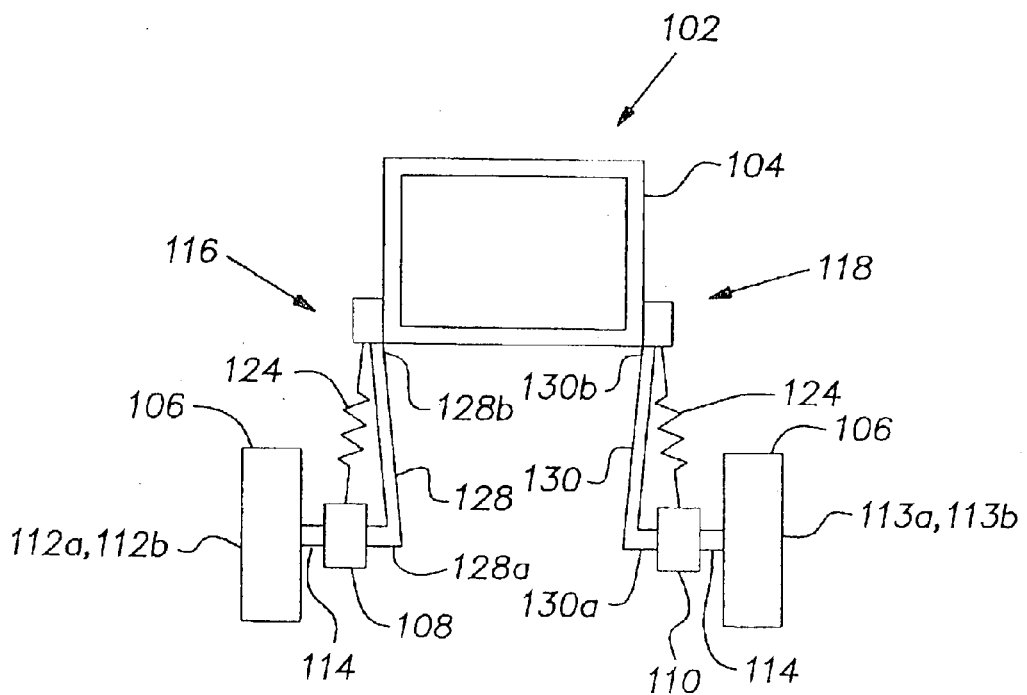
FIG. 5 is a schematic end view of the vehicle shown in FIG. 4.

FIGS. 4 and 5 schematically illustrate a rear portion of a half-track vehicle according to first embodiment of the present invention. The half-track vehicle 102 includes a frame 104, a pair of tracks 106, first and second beams 108,110, a plurality of wheels 112a, 112b, 113a, 113b, a plurality of cushions 124, and first and second trailing arms 128, 130. The vehicle further includes front wheels (not shown in FIGS. 4–5). The wheels are associated with one of a first and second lateral side 116, 118 of the vehicle 102 and are referred to hereinafter as being either a mid wheel 112a, 113a or a rear wheel 112b, 113b, respectively. Preferably, the rear wheels 112b, 113b are powered by known drive means (not shown), as will be apparent from the following discussion. Alternatively, the mid wheels 112a, 113a, or both the mid and rear wheels may be powered.

Each of the wheels 112a, 112b on the first lateral side 116 of the frame 104 is connected to the first beam 108, while each of the wheels 113a, 113b on the second or opposite lateral side 118 of the frame 104 is connected to a second beam 110. An axle 114 is associated with each of the wheels. The axles 114 are secured to the beams 108, 110 and extend outwardly therefrom, with the associated wheel being secured to an end of the axle, as is well known in the art. Naturally, if the rear wheels are powered, the rear axles will extend inwardly from the beam for connection to the drive means (not shown). Each of the axles 114 in the illustrated embodiment extend only between one of the beams 108, 110 and the associated wheel 112a, 112b, 113a, 113b such that no single axle interconnects wheels on the first and second sides 116, 118 of the vehicle.

Each beam 108, 110 is preferably made from two parts 134, 136 that slidably interfit with one another. In order to place the wheels within the track, the wheels 112a, 112b, 113a, 113b are attached to the axles 114, which are each secured to one of the beam parts 134, 136, and the two beam parts 134, 136 are slidably interfit with one another. The track 106 is then placed around the wheels, and the two parts 134, 136 are slid away from each other until the track 106 has the desired tension. Thereafter, the two beam parts 134, 136 are attached to one another using conventional techniques, such as mechanical fasteners.

Because it is often desirable to make the beams of steel for strength and durability, the two beam parts 134, 136 may be joined by welding, and an additional track-tensioning device (i.e., one associated with just one of the beam portions 134, 136) may be used to adjust the track tension which varies over time, due to age, use, humidity, and the like. Therefore, although the sliding feature and joining techniques described hereinbefore are illustrative of the preferred embodiment, the present invention is not limited thereto. Rather, it is believed apparent that many other structures and methods may be used to properly position and tension the track 106 on the wheels. In addition, while the use of the track 106 is desirable, it is not necessary, and the independently suspended beam structure can be used only with the wheels should the track be omitted.

A suspension system connects the beams 108, 110 to the frame 104 and permits the beams on each side of the frame to move relative to the frame and substantially independently of one another. The suspension system includes the cushions 124 and the trailing arms 128, 130.

With continuing reference to FIGS. 4 and 5, one of the cushions 124 extends between the first beam 108 and the frame 104, while an identical cushion 124 extends between the second beam 110 and the frame 104. Alternatively, a pair of cushions could be used on each side 116, 118, wherein one of the cushions will be disposed adjacent the mid wheel 112a, 113a, while another of the cushions will be disposed adjacent the rear wheels 112b, 113b. The cushions 124 shown in FIGS. 4–5 act as a spring that resists compression and tension, and thus serves to dampen vertical movement of the frame and beams relative to one another. Naturally, any known cushioning mechanism can be used, such as a shock absorber, hydraulic system, or the like, depending on the level of strength and durability needed. A person of ordinary skill in the art is able to select an appropriate structure for cushioning the movement of any particular beam structure.

The first trailing arm 128 is on the first side 116 of the vehicle and extends between the first beam 108 and the frame 104. The second trailing arm 130 is on the second side 118 of the vehicle and extends between the second beam 110 and the frame 104. More specifically, the trailing arms 128, 130 include a first end 128a, 130a pivotally secured to the associated beam 108, 110, respectively, and a second end 128b, 130b pivotally secured to the frame 104.

The pivotal connection between the trailing arm first end 128a, 130a and the beam 108, 110, on one hand, and between the trailing arm second end 128b, 130b and the frame 104, on the other hand, preferably is a swivel-type ball-and-socket type connection that permits the up, down, left and right motion of the trailing arm relative to the beam and frame. While most of the rotary motion at the connections will be in vertical direction as the beam 108, 110 moves upward and downward relative to the frame 104, a certain degree of horizontal pivoting, or a certain degree of movement including a horizontal component, may be desirable should the beams twist or cant during use. In addition to permitting a certain range of motion between the frame 104 and the beams 108, 110, the trailing arms 128, 130 also serve as the primary paths for transmitting driving force from the track structure to the frame 104, and therefore are relatively rigid. Accordingly, the trailing arm 128, 130 and the trailing arm joints or connections must be sufficiently strong to bear the forces communicated therethrough.

Because each of the first and second beams 108, 110 is separately joined to the frame 104 and is not joined to the other of the first and second beams 108, 110, the first and second beams are permitted to move independently of each other. Thus, one of the beams 108, 110 may raise/dip and rebound without causing the frame to twist due to the other beam 110, 108 simultaneously dipping/raising and rebounding.

It is noted herein that the illustration of the present invention in FIGS. 4 and is somewhat schematic and should not be taken too literally. For example, in the drawings the beams 108, 110 are positioned entirely below the frame 104. This depiction is for ease of understanding. The beams 108, 110 can be positioned nearer to and partially overlapping the frame 104, for instance as described hereinafter with reference to FIGS. 11–13. In addition, the frame 104 is shown as being generally rectangular with a square cross section. The frame 104 need not have such a geometric shape. In addition, the frame 104 may include any number of crossbars, rather than or in addition to the end cross bars shown. The cushions 124 and the trailing arms 128, 130 are shown as being attached near the bottom of the frame 104. However, the cushions 124 and the trailing arms 128, 130 need not be so positioned, but may instead be attached to the frame 104 at any convenient location.

Figure 6:
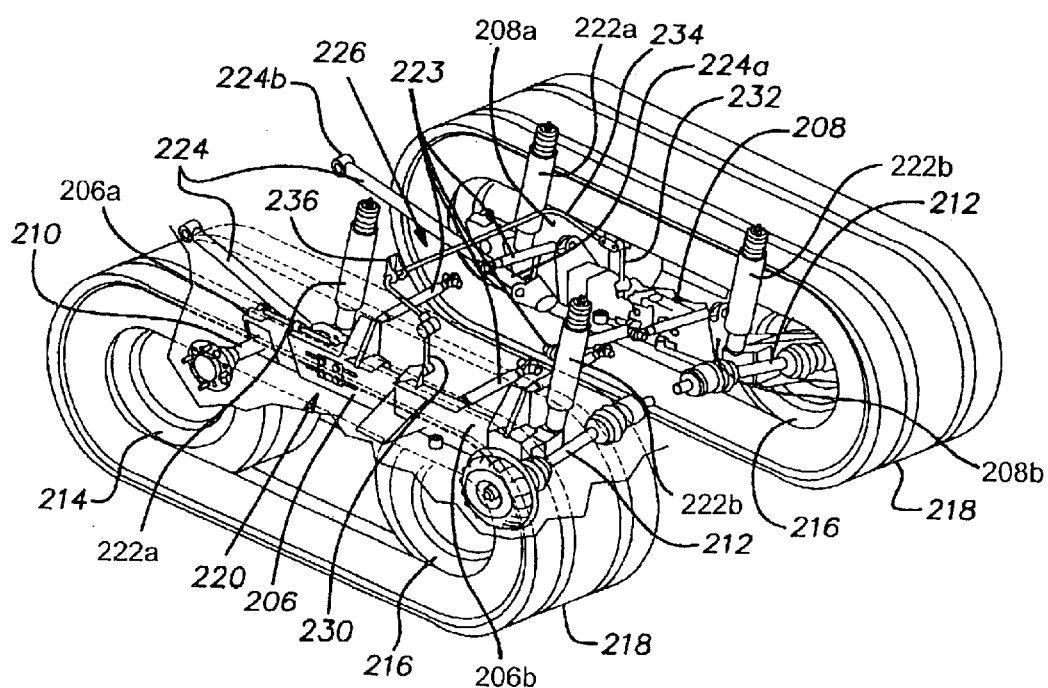
FIG. 6 is a perspective view, partially cut away, of a modified embodiment of a half-track suspension structure.
Figure 7:
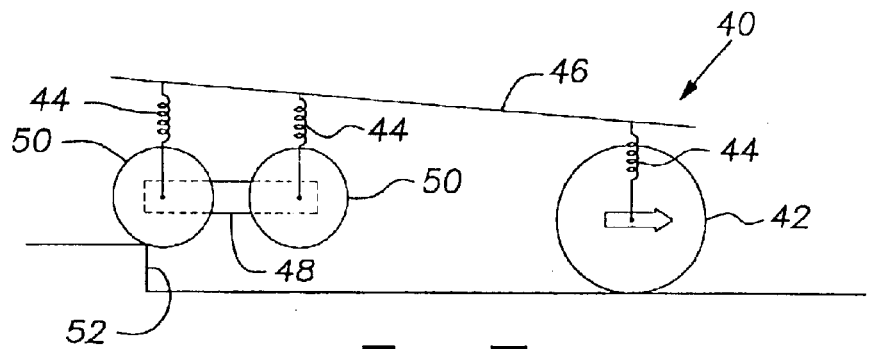
FIGS. 7 and 8 schematically illustrate operation of a prior-art vehicle over a sharp drop-off or step.
Figure 8:
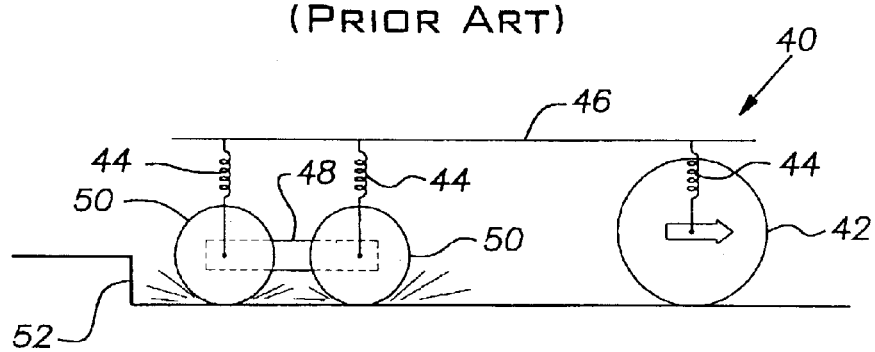

Turning now to FIG. 6, a rear portion of a half-track vehicle incorporating a particular configuration of a suspension system according to the present invention is illustrated, it being noted that the vehicle frame has not been shown in the drawing for purposes of clarity. Moreover, insofar as the structure on each lateral side of the half-track vehicle is identical, the following description is directed toward only one side, where appropriate, for purposes of brevity.

With reference to FIG. 6, a beam and track structure includes first and second beams 206, 208, a mid axle 210, a rear or drive axle 212, mid and rear wheels 214, 216, and a track 218. The first and second beams 206, 208 are preferably two-piece assemblies, as described hereinbefore, that are slidably interfit with one another, and secured in a desired position by a fastening assembly 220.

Each mid axle 210 is secured to the associated beam 206, 208, extends outwardly therefrom, and has one of the mid wheels 214 rotatably secured at a distal end thereof. Each rear axle 212 has an inner end that is operatively connected to a drive means (not shown) and an outer end extending through the associated first or second beam 206, 208. The rear or drive wheel 216 is affixed to the outer end of the rear axle 212 for rotation therewith. The track 218 extends around the mid and rear wheels 214, 216 and transmits driving force from the rear wheel 216 to the mid wheel 214.

A suspension system extends between the beams 206, 208 and the frame (not shown) generally in the manner described hereinbefore with regard to the first embodiment of the present invention. For each beam, the suspension system includes first and second cushions 222a, 222b, three transverse support arms 223, a trailing arm 224, and a stabilizer bar 226.

One of the cushions 222a is secured to a forward end 206a, 208a of each associated beam 206, 208 adjacent the mid wheel 214 while another cushion 222b is secured to a rearward end 206b, 208b of each beam adjacent the rear wheel 216. The cushions 222a, 222b support the weight of the vehicle and any load contained thereon, and also serve to dampen relative vertical motion between the frame and the beams 206, 208. In addition to the vertical motion inherently accommodated by the cushions 222a, 222b, the cushion upper and lower ends are preferably attached to the frame and beam, respectively, with a pivotal connection that will permit some range of non-vertical motion between the beam and frame.

The transverse support arms 223 extend laterally from the beam 206, 208 to the frame, and preferably include swivel-type ball and socket connections at each end to permit movement of the beam relative to frame, generally in a vertical direction but also in directions having non-vertical components. The transverse support arms 223 provide camber and toe-in control of the track belt 218, in conjunction with the trailing arm 224.

Each trailing arm 224 is secured to one of the beams 206, 208 at a location between the mid and rear wheels 214, 216, and extends therefrom to the frame. Each trailing arm 224 includes a lower end 224a and an upper end 224b. The lower end 224a is pivotally secured to the beam 206, 208 so as to permit the trailing arm 224 to rotate vertically, while the upper end 224b is connected to the frame with a swivel or ball-and-socket type connection to permit the trailing arm 224 to rotate in a vertical and in a non-vertical direction to accommodate slight misalignment between the beam 206, 208 and frame, as may occur during operation of the vehicle.

The stabilizer bar 226 extends from a central area of one beam 206 to a similar central area on the opposite beam 208. As will be apparent from the following discussion, the stabilizer bar 226 is preferably attached to each beam 206, 208 at a location midway between the mid and rear wheels 214, 216. While the stabilizer bar described hereinafter is preferred, it is noted that the present invention is not limited to the use of a stabilizer bar. Rather, alternative means for operatively interconnecting the beams to limit body roll may be used without departing from the scope and spirit of the present invention.

The stabilizer bar 226 includes a pair of upright support bar portions 230, 232 and a transverse, generally u-shaped connecting bar portion 234. Each upright support bar portion 230, 232 includes a lower end and an upper end. The lower end of the upright support bar 230, 232 is pivotally connected to the beam 206, 208, whereas the upper end of the upright support bar 230, 232 is pivotally connected to the free end of the u-shaped connecting bar 234, as illustrated. At a pair of spaced apart locations, the u-shaped connecting bar 234 is rotatably secured to the frame by bushings secured in mounting brackets 236.

The stabilizer bar 226 helps to counteract body roll, such as may occur when the vehicle is turned or when the vehicle is operated on a slanting surface. During such operation, the cushions 222a, 222b on one side of the vehicle expand or extend, causing the frame on that side of the vehicle to move away from the associated beam 206, 208. Since each upright support arm 230, 232 is connected between one of the beams 206, 208 and one of the free ends of the u-shaped connecting bar 234, the connecting bar 234 twists or rotates when one of the upright support arms moves vertically. The connecting bar transmits such torsional forces to the other upright support arm 232, 230, and thus forces the other side of the frame to move upwardly, which tends to expand or extend the cushions 222a, 222b on the other side of the vehicle. Accordingly, when the frame on one side of the vehicle moves upwardly (or downwardly) relative to one associated beam 206, 208, the stabilizer bar 226 forces the frame on the other side of the vehicle to move upwardly (or downwardly) relative to the other associated beam 208, 206. Thus, the stabilizer bar 226 serves as a spring-like element that imparts a biasing force between the frame and the beams 206, 208, and helps to resist one side of the frame from moving vertically relative to the other side of the frame. Insofar as the present invention is not limited to a suspension system incorporating the illustrated stabilizer bar, if more information is desired on the function of the stabilizer bar, reference should be made to commonly assigned U.S. patent application Ser. No. 10/383.148, (Docket No. HRA-I4000US1) the disclosure of which is expressly incorporated herein in its entirety.

As will be apparent from the following discussion, the effective connection between the beams 206, 208 is limited in practice by the placement or location of the stabilizer bar 226 along the length of the beams 206, 208. With that in mind, since the beams 206, 208 are attached to two wheels 214, 216, the beams will not be subject to the same upward motion along their lengths. Rather, when the illustrated mid wheel 214 contacts a small obstacle, such as a rock or stick, the associated beam 206, 208 will deflect in a generally clockwise direction. Similarly, when the rear wheel 216 contacts a similar small obstacle, the associated beam 206, 208 will deflect in a generally counter-clockwise direction. It is desirable to allow sufficient rotation in the stabilizer bar joints to permit such deflection without affecting the opposite-side beam.

As noted hereinbefore, the embodiment of FIG. 6 shows the use of two cushions 222a, 222b on each beam 206, 208. The first cushion 222a is positioned near a first or forward end 206a, 208a of the beam 206, 208 while the second cushion 222b is positioned near a second or rearward end 206b, 208b of the beam 206, 208. The use of two cushions 222a, 222b with each beam advantageously allows for variation in the suspension between the two cushions, as will be apparent from the following discussion.

The first cushion 222a is adjusted in terms of the spring length, pre-load, and/or shock absorber length to be different from that of the second cushion 222b. This is referred to hereinafter as increasing the suspension stroke of the first cushion 222a. If the suspension stroke is greater in the first cushion 222a than the second cushion 222b, the first ends 206a, 208a of the beams will tend to be a distance from the frame 104 that is larger than the distance that the second ends 206b, 208b of the beams are from the frame 104. This also permits the forward and rearward ends of the beams to hit the ground at different times when the vehicle encounters a large drop, as is shown best in FIGS. 9 and 10.

Figure 9:
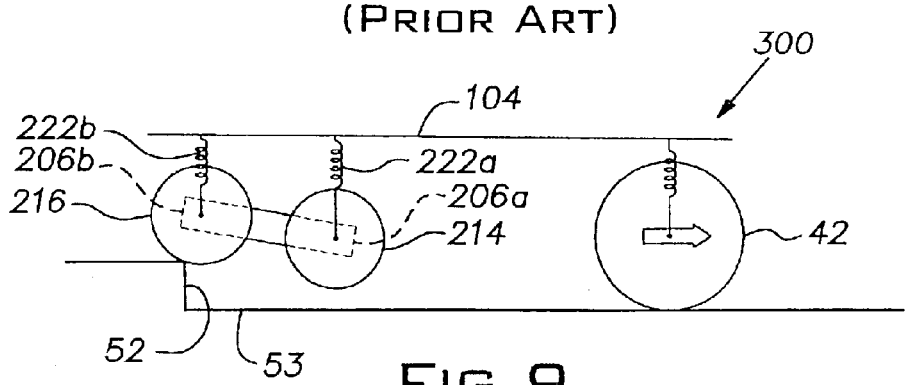
FIGS. 9 and 10 schematically illustrate operation of a vehicle incorporating the present invention over a sharp drop-off or step; and, FIGS. 11–13 schematically illustrate operation of the vehicle incorporating the present invention over a log or obstacle.
Figure 10:
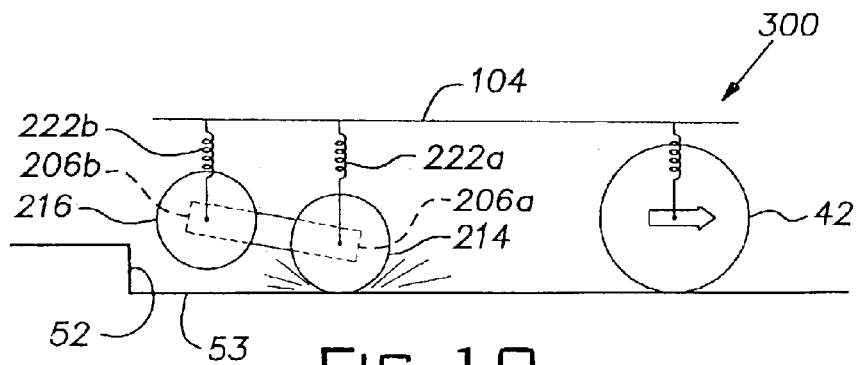

In FIG. 9, the rear of the vehicle 300 is going over the obstacle 52 and the first ends 206a, 208a of the beams 206, 208 and the associated mid wheels 214 have passed over the obstacle 52. Because the first cushions 222a are configured properly, the beams' first ends 206a, 208a and mid wheels 214 are closer to the ground 53 than the beams' second ends 206b, 208b and the accompanying rear wheels 216. When both wheels 214, 216 clear the obstacle 52, they will fall at the same rate towards the ground 53. However, due to the differences in the cushions 222a, 222b, and the resultant height of the beams' ends, the mid wheels 214 will contact the ground 53 before the rear wheels 216. The shock or impact will therefore be absorbed sequentially, which improves the overall ride of the vehicle 300. In addition, the present invention decreases the amount of time that no portion of the track is in contact with the ground 53, thereby maximizing the traction of the vehicle 300.

It is noted that the difference in suspension stroke mentioned above must be carefully calculated. It is important and desirable that the load or length not be so great that the beam and frame are not substantially parallel when the vehicle is riding on a flat surface. If the beam and frame are not substantially parallel when riding over a substantially flat surface, other types of typical shocks, such as from small rocks or sticks, will not be absorbed as easily, creating other ride discomfort. It is also noted that the suspension stroke difference means that suspension equalization cannot be used on a vehicle with this modification, as the two axles cannot carry the same load.

Also, it is important to consider the location of the drive shaft (not shown) when the foregoing configuration is used. If the vehicle is to be driven by a drive shaft, the drive shaft preferably powers the rear wheels 216 at the second end 206b, 208b of the beam 206, 208. The beam second end 206b, 208b is subject to a much smaller range of motion in this embodiment than the beam first end 206a, 208a. When configuring a drive shaft, it is preferable to minimize the range of motion necessary for the drive shaft. Therefore, it is important to attach the drive shaft to the rear wheels 216 so that the first ends 206a, 208a of the beams can be given as great a range of motion as possible.

The suspension system of the present invention may also be used to negotiate obstacles, such as logs, that a user may typically find in an off-road setting. It is desirable to use a tracked vehicle in an off-road setting, to ensure additional traction. However, in the past it has been difficult to configure a vehicle to both have a track that stays on the wheels consistently while still being able to climb over obstacles typical in an off-road setting. The problem that exists in maintaining sufficient surface area in contact with the ground and the obstacle with sufficient force to permit the tire to adequately climb the obstacle. This problem is exacerbated by the need to use a high pressure tire on the tracked vehicle to maintain the track securely on the vehicle, since the use of a high pressure tire reduces the amount of surface area between the tire and any obstacle. The present invention is only possible upon a recognition of the forces necessary to climb the obstacle and the design considerations that enable the use of the combination of a high pressure tire and a track to climb obstacles.

Figure 11:
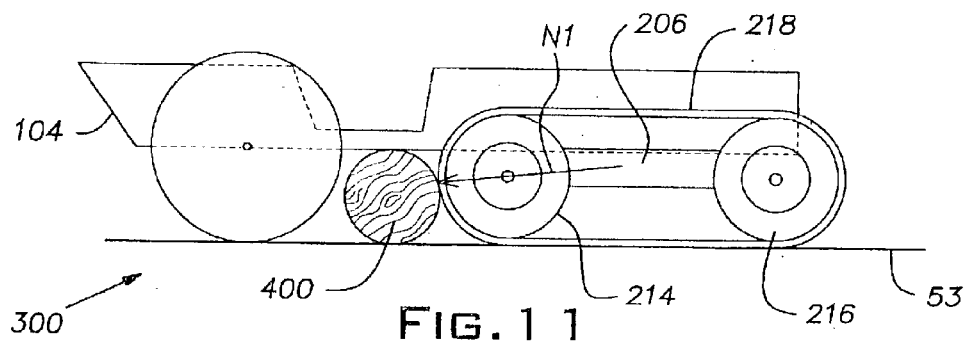

Turning first to FIG. 11, the vehicle 300 is shown with a mid wheel 214 coming into contact with a log or other obstacle 400. In this regard, it is noted that the vehicle frame 104 is shown at a vertical location just above, and preferably partially overlapping, the beams 206, 208.

At the time the mid wheel 214 comes into contact with the obstacle 400, the motive force of the vehicle 300 is provided by a drive train (not shown) connected to the rear wheel 216. The mid and rear wheels 214, 216 include high-pressure tires that are surrounded by the track 218. When the mid wheel 214 contacts the obstacle, the normal force between the mid wheel 214 and the obstacle 400 is that shown by the line N1. This force is slightly angled relative to a horizontal force, as the contact point between the mid wheel 214 and the obstacle 400 is modified by the track 108 and the track rotation.

Figure 12:
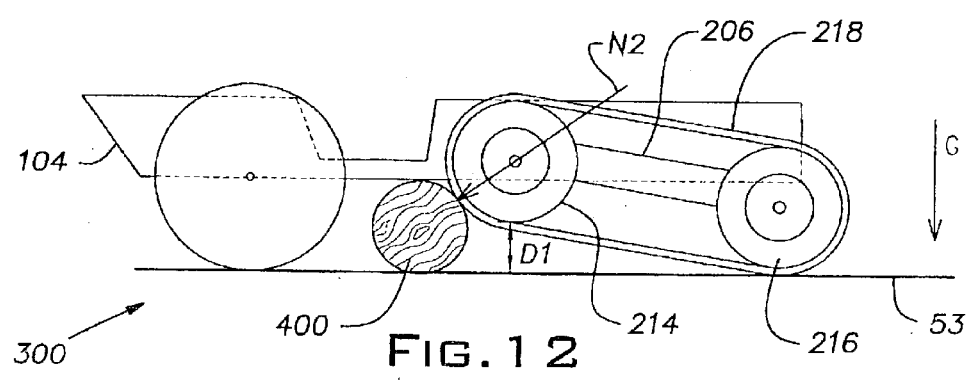

With reference to FIG. 12, the track 218 rotates about the wheels 214, 216 and through friction causes the mid wheel 214 to rise off the ground 53. The friction is created through the application of the normal force N1 to the obstacle through the mid wheel 214. The mid wheel 214 is typically permitted to rise a designated distance D1 (referred to hereinafter as an intermediate distance) as the track rotates. The intermediate distance D1 is typically governed carefully to keep the beam 206, 208 relatively low on the vehicle in order to keep the beam from over-rotating. Thus, in the prior art, the intermediate distance D1 would be the maximum distance that the mid wheels 214 could lift off the ground. However, when the mid wheel 214 reaches the intermediate distance D1, additional frictional force tends to pull the rear wheel 216 off the ground, and thereby reduces the force applied between the mid wheel 214 and the obstacle 400. It is also at this point that the frictional force necessary to pull the mid wheel 214 over the obstacle 400 becomes more important. Before reaching the maximum distance D1, the frictional force need only be great enough to lift the first or forward end 206a, 208a of the beams 206, 208 vertically.

Should the mid wheels 214 be precluded from raising beyond the intermediate distance D1, the rear wheel 216 will leave the ground 53 and the force between the mid wheel 53 and the obstacle 400 will be the only force to move the vehicle 300. Therefore, in this situation (i.e., mid wheels cannot lift beyond the intermediate distance D1), once the intermediate distance D1 is reached, the force must be great enough to lift much of the weight of the vehicle. However, at that position the force application quickly becomes insufficient to maintain the frictional engagement between the mid wheel 214 and the obstacle. This is because the motive force from the rear wheel 216 is directed at an angle to the obstacle 400. This loss of motive force is further exacerbated by the fact that the angle at which the mid wheel 214 contacts the obstacle 400, the normal angle N2, is too great with respect to the gravitational force G to allow the weight of the vehicle to create a significant normal force to help with friction. Accordingly, the rear wheel 216 is lifted off the ground, reducing the rear wheel's traction, and preventing the vehicle 300 from continuing to move over the obstacle.

Figure 13:
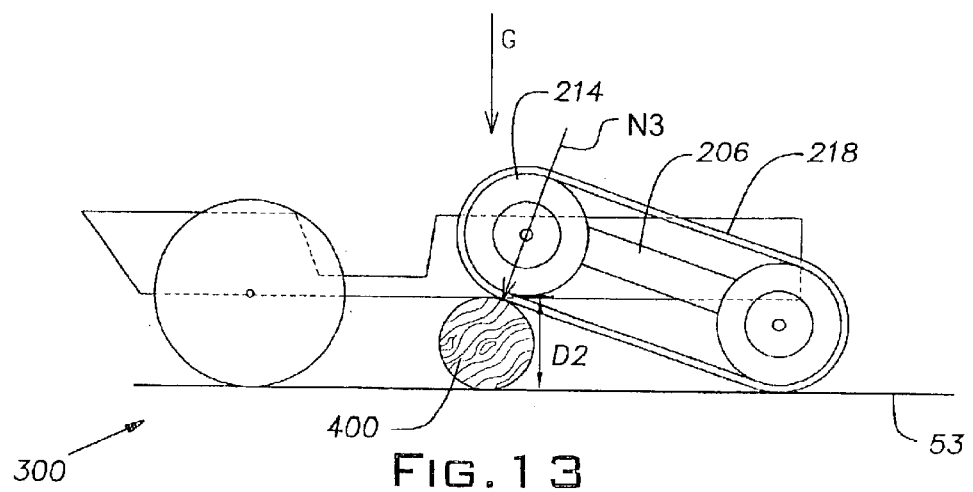

With reference to FIG. 13, the wheels are permitted to lift from the ground to a maximum distance D2, which is substantially equal to the space between the frame and ground (frame clearance), and substantially greater than the intermediate distance D1. Accordingly, in the present invention the vertical distance D1 is an intermediate position as the wheel 214 moves seamlessly toward the vertical distance D2. At the maximum vertical distance D2, the frictional force between the mid wheels 214 and the obstacle 400 need only be great enough to lift the forward ends of the beams 206, 208 and the front wheel 214 and overcome any forces from the suspension system (not shown in these drawings, but described above).

The distance D2 need only be great enough that the normal force N3 will be great enough to pull the remaining weight of the vehicle over the obstacle. In addition, the increased distance D2 permits the rear wheels 216 and track 218 to remain on the ground until the rear wheel 216 is closer to the obstacle. As the rear wheels 216 approach the obstacle 400 and the space between the mid wheels 214 and the ground 53 increases toward the distance D2, the direction of the normal force N3 becomes more vertical. As the normal force N3 becomes more vertical, the weight of the vehicle itself is placed on the mid wheels 214 and the obstacle 400, thereby increasing the frictional force between them. This creates sufficient force to allow the weight of the vehicle to be pulled over the obstacle.

It will be appreciated that increasing the vertical travel of the mid wheels 214 involves increasing the stroke of the suspension system. For example, the cushions 222a, 222b will have to be able to contract an amount at least equal to the distance D2. The transverse support arms 223 and trailing arms 228, 230 connected between the beams 206, 208 and the frame 104 will also have to provide a range of motion to accommodate this increased permitted movement of the mid wheels 214 and beams relative to the frame 104. The structure interconnecting the beams 206, 208 (i.e., stabilizer bar 226) may also need to be modified to accommodate this large range of motion. It is considered apparent that one skilled in the art, empowered by knowledge of the present invention described herein, will be easily capable of making the necessary modifications to the existing vehicle structure to realize the invention.

Although the inventive suspension has been described in the foregoing in use on a motorized vehicle, it is considered apparent that the suspension system is capable of use on a trailer that has no independent motive power. The use of the inventive suspension on a trailer would be useful in situations wherein the trailer is used in off-road applications, such as in agriculture, logging, or, the like. In such agricultural applications, it is important to minimize the pressure on the ground from the trailer, to prevent damaging crops or soil compaction.

Another area in which a trailer would be useful occurs when the trailer is to be used on snow or in a muddy area, particularly if there is rough terrain. In these cases and similar situations, the use of a tracked vehicle distributes the weight of the trailer, minimizing the weight in any one particular area. In such a situation, the independent suspension to be described below remains important, due to the inherent unevenness of the terrain. However, no motive power need be used, since the trailer will be pulled by another, powered vehicle. Accordingly, there is no absolute necessity for a drive train assembly to be used in connection with the present vehicle.

The structure shown as suspending the beam from the frame, namely, the cushions and the trailing arms, are shown only as an example, and can be easily modified by a person of ordinary skill in the art. A person of ordinary skill in the art can easily add additional cushions and change the relative locations of the cushions and the trailing arms. For example, although the trailing arms have been shown secured to about a middle portion of its associated beam, it is contemplated that the trailing arm be located closer to one of the ends of the beam, for purposes disclosed hereinbefore.

Furthermore, additional suspension components or parts may be added to, or substituted for, those described hereinbefore. For example, a standard A-arm, half shafts, and various arms may be employed. The number and position of these can be modified in a variety of ways in order to permit movement by the beam in three dimensions and the particular configuration desirable for a particular application will vary depending on the desired strength and durability necessary. For example, although the stabilizer bar is shown as a multi-piece construction herein, it is contemplated that the stabilizer bar could likewise be formed in one piece.

Moreover, the present invention is not limited to the track and wheels particularly described herein, it being considered apparent that numerous equivalent structures can be substituted therefor. For example, any type of track may be used with the present configuration, such as a steel track or a rubber track, may be used. If a steel track is used, it is desirable to attach rubber blocks or ridges to the surface of the track, as is conventional. If a rubber track is used, it is desirable to form ridges or other track patterns on the outer surface of the track. In addition, guides, typically referred to as "gaiters", may be included on the track. These are a series of spike-like elements that project from the inner surface of the track toward the wheel. These are used on the outside of the wheel, and on each side of the wheel to better secure the wheel in the track. Alternatively, one guide can be used between two wheels for the same purpose. If the track is made from rubber, it is desirable to use some sort of reinforcement within the track. The reinforcement should have both longitudinal and transverse components. Accordingly, the reinforcements may run along both the width and the length of the track, or be oriented at a 45-degree angle to the longitudinal axis of the track. The reinforcements may take the form of fiber reinforced plastic rods, steel rods, or cords or cables made of plastic, Kevlar, or other appropriate materials.

The wheels may be pneumatic, steel, or solid plastic or rubber. Pneumatic wheels tend to generate an improved ride. In the preferred embodiment, the wheels are pneumatic, while the track is made from rubber, preferably having a thickness of at least one-inch. Finally, it is desirable to use a tread pattern or ridges of some sort on the outside of the tread for better traction by the track.

What is claimed is:

1. A half-track vehicle, comprising:
   (a) a frame having a first side and a second side;
   (b) a first beam disposed at the first side of said frame and having a forward end and a rearward end;
   (c) a second beam disposed at the second side of said frame and having a forward end and a rearward end;
   (d) a first suspension system suspending the first beam from the frame adjacent the first side of the frame, said first suspension system including first and second cushions, said first suspension system first cushion extending between said first beam first end and said frame, said first suspension system second cushion extending between said first beam second end and said frame;
   (e) a second suspension system substantially separate from the first suspension system suspending the second beam from the frame adjacent the second side of the frame, said second suspension system including first and second cushions, said second suspension system first cushion extending between said the first end of said second beam and said frame, said second suspension system second cushion extending between said second beam second end and said frame;
   (f) first wheels attached to each of said first and second beams adjacent the forward ends thereof;
   (g) second wheels attached to each of said first and second beams adjacent the rearward ends thereof;
   (h) wherein said first cushions have a first suspension stroke and said second cushions have a second suspension stroke, and wherein said first suspension stroke is greater than said second suspension stroke.

2. The vehicle according to claim 1, further comprising means interconnecting said first and second beams to limit body roll.

3. The vehicle according to claim 2, wherein each of said first and second suspension systems includes a trailing arm that extends between said frame and said first and second beams so that driving forces imparted to said beams cause said frame to move with said beam.

4. The vehicle according to claim 1, wherein, when said vehicle rides over a step or drop-off, said first wheels engage the ground before said second wheels.

5. The vehicle according to claim 4, further comprising means interconnecting said first and second beams to limit body roll.

6. The vehicle according to claim 5, wherein each of said first and second suspension systems includes a trailing arm that extends between said frame and said first and second beams so that driving forces imparted to said beams cause said frame to move with said beam.

7. A half-track vehicle, comprising:
   (a) a frame having a first side and a second side and being spaced a first distance from a ground surface;
   (b) a first beam disposed at the first side of said frame and having a forward end and a rearward end, said first beam being spaced a second distance from the ground surface;
   (c) a second beam disposed at the second side of said frame and having a forward end and a rearward end, said second beam being spaced the second distance from the ground surface;
   (d) a first suspension system suspending the first beam from the frame adjacent the first side of the frame, said first suspension system Including first and second cushions, said first suspension system first cushion extending between said first beam first end and said frame, said first suspension system second cushion extending between said first beam second end and said frame;

(e) a second suspension system substantially separate from the first suspension system permitting either of the first and second beams to move relative to the frame without substantially affecting the other of the first and second beams the second suspension system suspending the second beam from the frame adjacent the second side of the frame, said second suspension system including first and second cushions, said second suspension system first cushion extending between said end of said second beam and said frame, said second suspension system second cushion extending between said second beam second end and said frame;

(f) first wheels attached to each of said first and second beams adjacent the forward ends thereof;

(g) second wheels attached to each of said first and second beams adjacent the rearward ends thereof;

(h) wherein when said first wheels engage an obstacle, said first wheels and said forward ends of said beams are adapted to raise vertically such that said first wheels are lifted vertically toward said first distance from the ground and ride over said obstacle.

8. The vehicle according to claim 7, further comprising drive means for rotatably driving said second wheels and tracks extending around said first and second wheels to transfer rotary driving motion from said second wheels to said first wheels.

9. The vehicle according to claim 8, wherein said second wheels approach the obstacle as said first wheels are lifted vertically toward said first distance.

10. The vehicle according to claim 9, wherein said first and second beams are angled with respect to said frame as said first wheels are lifted vertically toward said first distance.

11. The vehicle according to claim 10, further comprising means interconnecting said first and second beams to limit body roll.

12. The vehicle according to claim 11, wherein each of said first and second suspension systems includes a trailing arm that extends between said frame and said first and second beams so that driving forces imparted to said beams cause said frame to move with said beam.

13. A half-track vehicle, comprising:

(a) a frame having a first side and a second side and being spaced a first distance from a ground surface;

(b) a first beam disposed at the first side of said frame and having a forward end and a rearward end, said first beam being spaced a second distance from the ground surface;

(c) a second beam disposed at the second side of said frame and having a forward end and a rearward end, said second beam being spaced the second distance from the ground surface;

(d) a first suspension system suspending the first beam from the frame adjacent the first side of the frame, said first suspension system including first and second cushions, said first suspension system first cushion extending between said first beam first end and said frame, said first suspension system second cushion extending between said first beam second end and said frame;

(e) a second suspension system substantially separate from the first suspension system suspending the second beam from the frame adjacent the second side of the frame, said second suspension system including first and second cushions, said second suspension system first cushion extending between said the first end of said second beam and said frame, said second suspension system second cushion extending between said second beam second end and said frame;

(f) first wheels attached to each of said first and second beams adjacent the forward ends thereof;

(g) second wheels attached to each of said first and second beams adjacent the rearward ends thereof;

(h) wherein when said first wheels engage an obstacle, said first wheels and said forward ends of said beams are adapted to raise vertically such that said first wheels are lifted vertically toward said first distance from the ground and ride over said obstacle; and, (i) wherein said first cushions have a first suspension stroke and said second cushions have a second suspension stroke, and wherein said first suspension stroke is greater than said second suspension stroke.

14. The vehicle according to claim 13, further comprising drive means for rotatably driving said second wheels and tracks extending around said first and second wheels to transfer rotary driving motion from said second wheels to said first wheels.

15. The vehicle according to claim 14, wherein said second wheels approach the obstacle as said first wheels are lifted vertically toward said first distance.

16. The vehicle according to claim 15, wherein said first and second beams are angled with respect to said frame as said first wheels are lifted vertically toward said first distance.

17. The vehicle according to claim 13, wherein, when said vehicle rides over a step or drop-off, said first wheels engage the ground before said second wheels.

18. The vehicle according to claim 17, further comprising means interconnecting said first and second beams to limit body roll.

19. The vehicle according to claim 18, wherein each of said first and second suspension systems includes a trailing arm that extends between said frame and said first and second beams so that driving forces imparted to said beams cause said frame to move with said beam.

20. The vehicle according to claim 16, wherein, when said vehicle rides over a step or drop-off, said first wheels engage the ground before said second wheels.

21. The vehicle according to claim 20, further comprising means interconnecting said first and second beams to limit body roll.

22. The vehicle according to claim 21, wherein each of said first and second suspension systems includes a trailing arm that extends between said frame and said first and second beams so that driving forces imparted to said beams cause said frame to move with said beam.

* * * * *

UNITED STATES PATENT AND TRADEMARK OFFICE
CERTIFICATE OF CORRECTION

PATENT NO. : 6,840,338 B2  Page 1 of 1
DATED : January 11, 2005
INVENTOR(S) : Bowers et al.

It is certified that error appears in the above-identified patent and that said Letters Patent is hereby corrected as shown below:

Column 12,
Line 67, delete "Including" and insert therefore -- including --

Column 13,
Line 10, after "beams" insert -- , --
Line 15, before "end" insert -- first --

Signed and Sealed this

Twelfth Day of April, 2005

JON W. DUDAS
*Director of the United States Patent and Trademark Office*